US006308744B1

United States Patent
Becherucci et al.

(10) Patent No.: US 6,308,744 B1
(45) Date of Patent: Oct. 30, 2001

(54) METHOD AND APPARATUS FOR PLACING WIRE COILS WITH VARIED LENGTHS ON DYNAMO ELECTRIC MOTOR STATORS

(75) Inventors: Raffaele Becherucci, Florence; Gianfranco Stratico, Siena, both of (IT)

(73) Assignee: Axis USA, Inc., Tampa, FL (US)

( * ) Notice: Subject to any disclaimer, the term of this patent is extended or adjusted under 35 U.S.C. 154(b) by 0 days.

(21) Appl. No.: 09/590,532

(22) Filed: Jun. 8, 2000

Related U.S. Application Data
(60) Provisional application No. 60/139,157, filed on Jun. 14, 1999, and provisional application No. 60/141,158, filed on Jun. 25, 1999.

(51) Int. Cl.$^7$ .................................................. B21F 3/00
(52) U.S. Cl. ............................................................ 140/92.1
(58) Field of Search ................................................ 140/92.1

(56) References Cited

U.S. PATENT DOCUMENTS

| | | | |
|---|---|---|---|
| 3,346,021 | 10/1967 | Ross | 140/92.2 |
| 3,672,026 | 6/1972 | Cutler et al. | 29/205 R |
| 3,672,040 | 6/1972 | Arnold | 29/596 |
| 3,686,735 * | 8/1972 | Hill | 140/92.1 |
| 3,872,897 * | 3/1975 | Droll et al. | 140/92.1 |
| 3,977,444 | 8/1976 | Lauer et al. | 140/92.1 |
| 4,489,764 * | 12/1984 | Walker | 140/92.1 |
| 4,562,642 | 1/1986 | Fichtner | 29/734 |
| 4,617,972 * | 10/1986 | Walker | 140/92.1 |
| 5,251,678 | 10/1993 | Orecchia | 140/92.1 |
| 5,647,405 | 7/1997 | Fichtner et al. | 140/92.1 |

FOREIGN PATENT DOCUMENTS

| | | | |
|---|---|---|---|
| 572 291 | 1/1976 | (CH) | H02K/15/04 |
| 37 29 289 A1 | 3/1989 | (DE) | H02K/15/04 |
| T098 A 000617 | 2/2000 | (IT) . | |

* cited by examiner

Primary Examiner—Lowell A. Larson
(74) Attorney, Agent, or Firm—Fish & Neave; Robert R. Jackson

(57) ABSTRACT

An apparatus for forming varied length wire coils for insertion stator core slots includes a template positioned that is configured to vary a length of consecutive wire turns while wire is received from a flyer winder. The wire turns may then be inserted into a pair of stator core slots depending upon their respective lengths. A method of using the apparatus to form a winding with varied length turns includes depositing wire turns on a template, varying a length of at least two consecutive wire turns as the wire is deposited on the template, removing the wire turns from the template, and inserting the removed wire turns into a stator core slot.

34 Claims, 8 Drawing Sheets

METHOD AND APPARATUS FOR PLACING WIRE COILS WITH VARIED LENGTHS ON DYNAMO ELECTRIC MOTOR STATORS

CROSS REFERENCE TO RELATED APPLICATION

This claims the benefit of U.S. Provisional Applications No. 60/139,157, filed Jun. 14, 1999, and 60/141,158, filed Jun. 25, 1999.

BACKGROUND OF THE INVENTION

The present invention relates to solutions for winding coils of stators that are used in induction motors. More particularly, the invention relates to winding wire coils with turns that have different lengths and inserting the completed coils into stator core slots.

Electric motors generally include two main parts—a fixed hollow portion known as a "stator" and a portion that rotates inside the stator, called a "rotor" or an "armature." Electrically conducting coils of wire are typically wound in longitudinal slots on the stator. Rotors are configured in many different ways, but they are also wound with electrically conducting wire. Current supplied to the rotor wires interacts with a magnetic field that is produced in the stator to create the torque that is required to operate the motor.

Wire coils are typically formed by winding wire around a pair of the longitudinal slots described above. Sections of the wire coils typically span across the end of the stator where they exit one slot and enter the other. Filling the slot with wire generally requires placing some turns deeper inside the slot (i.e. further away from the central axis of the stator core) than others. In the most common winding methods, all turns of wire in the coil are formed with approximately the same length of wire. The length of wire that is used during winding is that which is required to form the longest turns—those that will be placed furthest away from the axis of the core. As a result, the turns that are placed closer to the central axis usually have more wire than they need to be routed through the portions of the slot where they rest. This means that there is more slack in those turns that are placed closer to the center of the core than there is in those that are more deeply inserted.

At least one existing device is capable of forming wire coils with turns that have different lengths. An apparatus that may accomplish such a task has been described in U.S. Ser. No. 09/348,551 filed Jul. 7, 1999, now U.S. Pat. No. 6,206,052, the contents of which are hereby incorporated by reference in their entirety. In such a device, wire is wound around a template while its sections are moved toward or away from each other in a direction orthogonal to the longitudinal axis of the template. Moving the template sections apart during winding forms a larger wire turn, while moving them together forms a smaller wire turn.

The present invention proposes new solutions for forming coil turns with varied lengths and for placing completed coils that are made from such turns into stator core slots. In one embodiment, the relative positioning of the sections of a template are altered as wire is wound around the template. As described earlier, altering template positioning during winding enables the turns to be formed with different lengths. These varied length turns are gathered to make the completed coils.

According to an aspect of the invention, wire turns are deposited on an insertion tool in an order that is dependent upon the length around the longitudinal slot pair at the depths at which it is desired to place the turns. More specifically, wire turns will be deposited on the insertion tool in an order that is dependent upon their respective lengths. These respective lengths will, in turn, be dependent upon the distance around the slot at the depth at which it is intended to place the turn. The turns are placed between rods that are positioned to match predetermined angular locations of the stator slots, and the completed coils are pushed along the rods and into the appropriate pair of slots on the stator core.

The present invention can be used to form a coil with varied length turns, and to position the turns in each coil such that they rest at the depth inside the slot that is most appropriate for their lengths. Turns will preferably rest at the location inside the slot that will use substantially the entire length of the wire turn in routing the wire between the slots and around the stator core. Tension in each wire will preferably be optimized. That is, the amount of tension in each wire will preferably be high enough to form turns without slack, while being low enough to avoid pulling and stretching the wire.

SUMMARY OF THE INVENTION

Objects of the invention include eliminating excessive wire consumption, efficiently filling stator core slots, and achieving optimal wire tension in completed coils. An embodiment of the invention achieves these objects by providing apparatus for winding stator core slots with wire coils that have varied lengths, characterized in that it includes a template positioned to receive wire from a winder. The template is configured to vary a length of at least two consecutive wire turns as it receives the wire. An insertion tool is also provided. The insertion tool collects the wire turns in an order that is dependent upon their respective lengths, and maintains the turns in this collected order.

Another embodiment of the invention includes a method of winding stator core slots with wire coils that have varied lengths, that includes the steps of varying a length of at least two consecutive wire turns as the wire turns are formed on the template, delivering the consecutive varied length wire turns to an insertion tool in an order that is dependent upon their respective lengths, collecting the delivered wire turns to form a coil and maintaining the wire coil in the collected order. The wire coil is subsequently inserted into a pair of stator core slots.

BRIEF DESCRIPTION OF THE DRAWINGS

A preferred embodiment of the invention will now be described with reference to the annexed drawings, given purely by way of non-limiting example, in which.

DESCRIPTION OF A PREFERRED EMBODIMENT OF THE INVENTION

The present invention relates to solutions for winding coils of stators, and particularly to forming wire coils that have different lengths. Such coils will preferably be inserted into pairs of longitudinal slots that are present in stator cores.

The ideal length for a wire turn that will be wound on a stator core is a function of how deeply the turn should rest inside the pair of slots into which it will be inserted. Turns with different lengths may be formed by winding wire around a template whose diameter can be varied during winding. One way to vary the diameter of a template is to alter the relative positioning of sections from which it is formed. Template sections are typically moved apart during winding to form a larger wire turn and moved closer together during winding to form a smaller turn.

According to the invention, as a coil is formed, its individual turns are transferred from the template to an insertion tool. Significantly, wire turns are transferred to the insertion tool in an order that is dependent upon their lengths, which is generally a function of how deeply they will be inserted into a pair of longitudinal slots on a stator core. When a device such as that described above is used, wire turns that are formed first are usually the shortest, and they will typically be transferred to the insertion tool first. The second formed turn that is slightly longer will be formed next, and consecutively formed turns that gradually get longer as winding proceeds are formed in succession. The wire turns are inserted in the slots in the reverse order of the way they are delivered to the insertion tool. Thus, when the smallest coils rest on the bottom and the largest coils rest on the top, the largest coils will be inserted into the slots first and the smallest will be inserted last. This produces wire coils with the largest turns resting in the deepest portions of the slots and the smallest turns resting nearest the central axis of the core.

An insertion tool preferably has rods which are positioned to match predetermined angular positions of the slots in the stator where the finished coils will be placed. The tool is transported to the stator and its rods are aligned with the stator core slots. The turns of the coil are then pushed along the rods and inserted into the designated slots.

Figure 1:
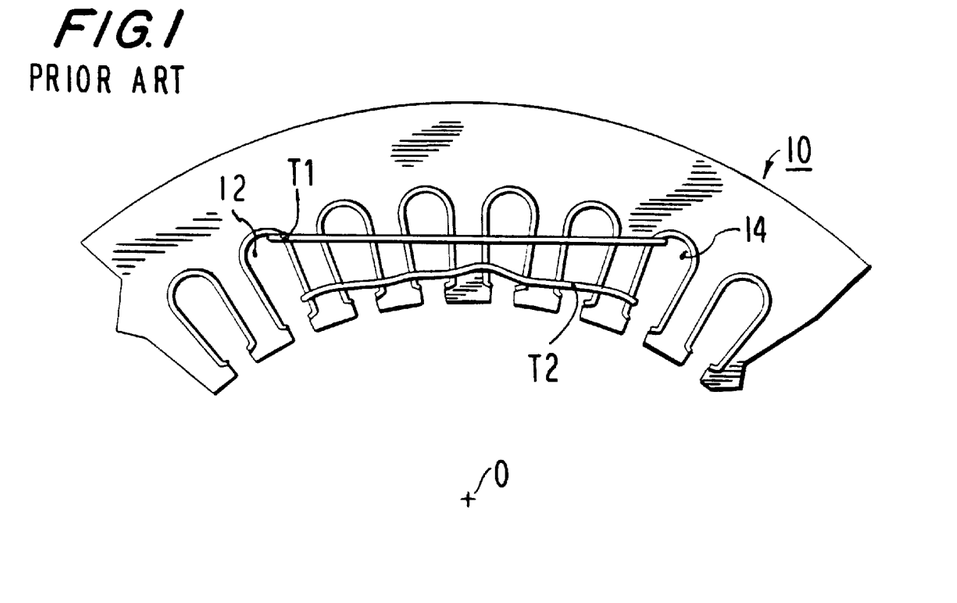
FIG. 1 shows an end view of a stator core with slots that have been wound with a traditional coil.

Referring now to the drawings which are provided to describe exemplary embodiments of the invention and not for limiting same, FIG. 1 shows an end view of a stator core 10 with slots 12 and 14 that hold constant length wire turns. For sake of clarity, only the external portion of two turns T1 and T2 of the traditional coil are illustrated here. Those skilled in the art will recognize that a finished coil will typically have many more than two turns, and that the end of a stator 10 will usually not appear exactly as shown here when a full coil has been inserted into slots 12 and 14.

Turns T1 and T2 span across the end of stator core 10, and rest inside slots 12 and 14. When a coil has been inserted into slots 12 and 14, turn T1 rests deeper inside each slot (i.e. further away from the central axis O of the stator core), than does turn T2. Again, all turns T1 and T2 of the coil have been formed with approximately the same length of wire. This wire length is just sufficient for routing those turns such as T1 which rest deepest inside the slots. Thus, the length of turn T1 exceeds that which is needed to form the turns like T2 which rest closer to the central axis of the stator. As shown, when constant length wire turns are provided, turns T2 will typically have significantly more slack than turns T1.

The present invention proposes methods and apparatus for forming coil turns T1 and T2 with lengths that are dependent upon the depth inside slots 12 and 14 at which it is desired to place them. Under such circumstances, each of the wire turns will be just long enough to be routed through the designated pair of slots and around stator core 10 with a minimal amount of slack. While as much slack should be eliminated as is possible, it is also important to avoid placing too much tension on the wire. The turns are preferably placed inside the slot in descending size order to place the longest turns deepest into the slots. This allows a large volume of wire to fit in the available slot space.

Figure 2:
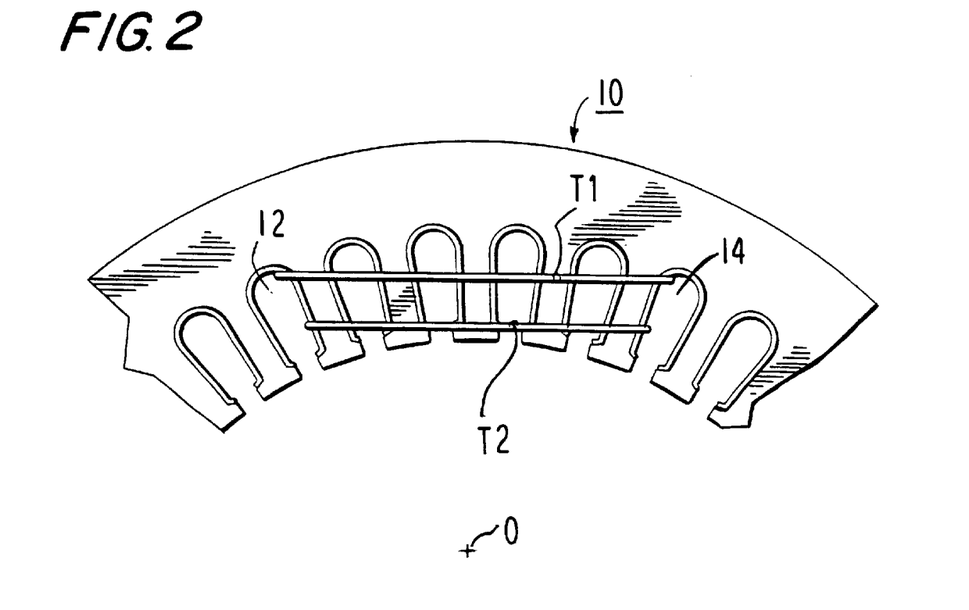
FIG. 2 is an end view of a stator core wound according to the principles of this invention.

Turning now to FIG. 2, an end view of a stator core wound using the method and apparatus of the present invention is illustrated. Turns T1 and T2 span across the end face of the stator core 10 as in FIG. 1. However in FIG. 2, turn T2 is formed with wire that has a shorter length and less slack than turn T1. Note that unlike turn T2 of FIG. 1, neither turn contains a significant amount of slack.

Figure 3:
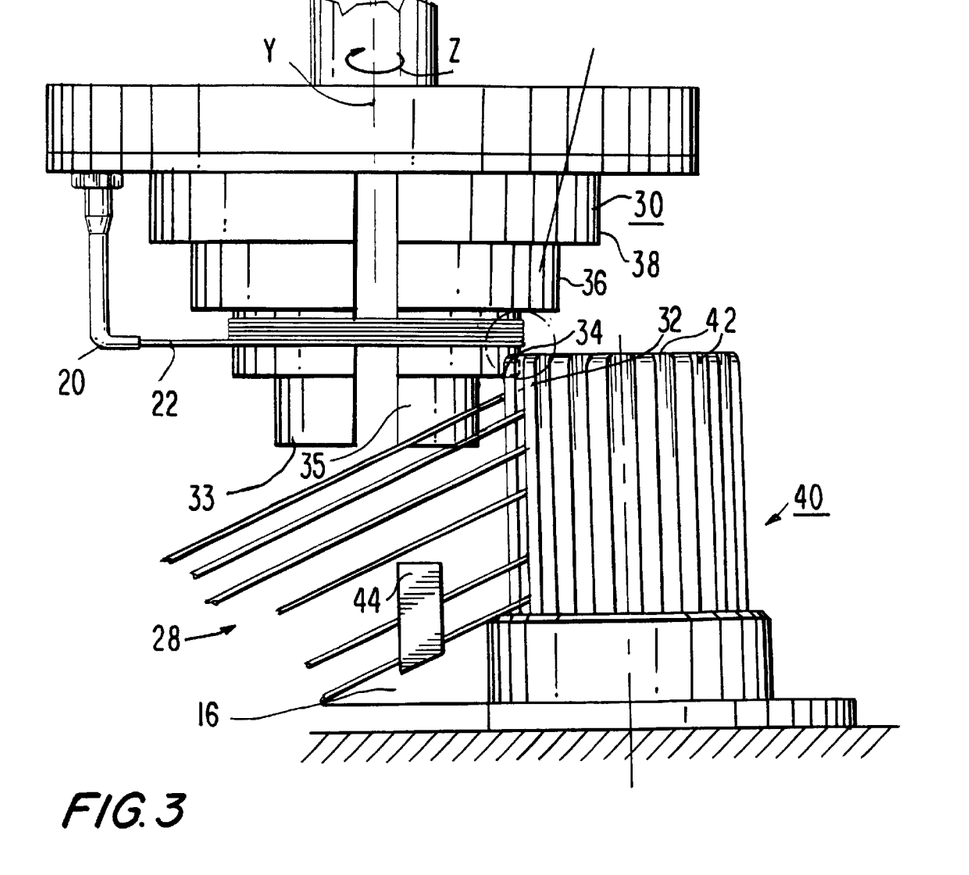
FIG. 3 is a schematic elevation view of a template, winder and insertion tool according to an aspect of the invention.

Referring now to FIG. 3, in accordance with the invention, the lengths of wire turns 28 are gradually varied as flyer 20 rotates around template 30. This creates long turns which can be placed furthest into slots 12 and 14 as well as progressively shorter turns that can be placed closer to the central axis O of stator core 10. In the embodiment of the invention illustrated here, template 30 has four steps 32, 34, 36 and 38, and two sections 33 and 35 whose relative positioning can be altered by varying distance d between them.

This relative positioning will often, but not always, be altered by moving the sections of template 30 in a direction orthogonal to the longitudinal axis of the template, either toward or away from each other. As those skilled in the art will recognize, sections 33 and 35 could also be subjected to angular displacements in order to vary the size of wire turns 28. It is intended to embrace all such alternative embodiments of the invention.

Figure 3A:
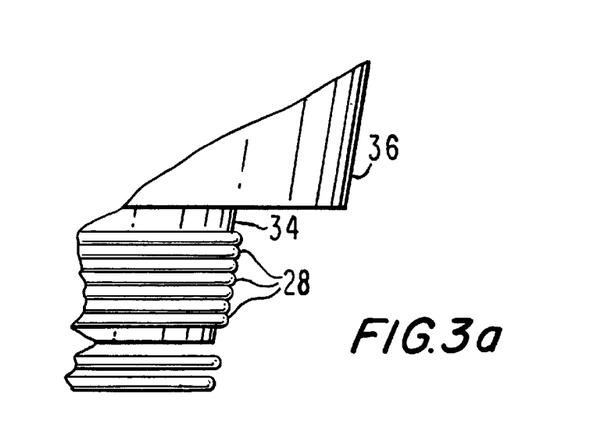
FIG. 3A is a detailed view of the inclined surface of a step illustrated in FIG. 3.

In the preferred embodiment of the invention the outside perimeter of template sections 33 and 35 will be inclined slightly towards the central axis Y of the template as indicated in FIG. 3A. This will assist completed turns 28 in falling from template 30 and towards insertion tool 40. As they descend, turns 28 will be deposited between rods 42 of insertion tool 40 which are aligned just below template 30.

An inward incline of the template steps 32, 34, 36 and 38 will also help to prevent the wire from becoming over tensioned as template sections 33 and 35 are separated. The ideal angle of this incline is dependent on the characteristics of the wire that is being delivered to template 30 (i.e. gauge, material, etc.) and the manner in which separation distance d is controlled (i.e. changed after a given number of turns are formed on each step, or after a designated length of wire has been delivered, etc.).

Figure 13:
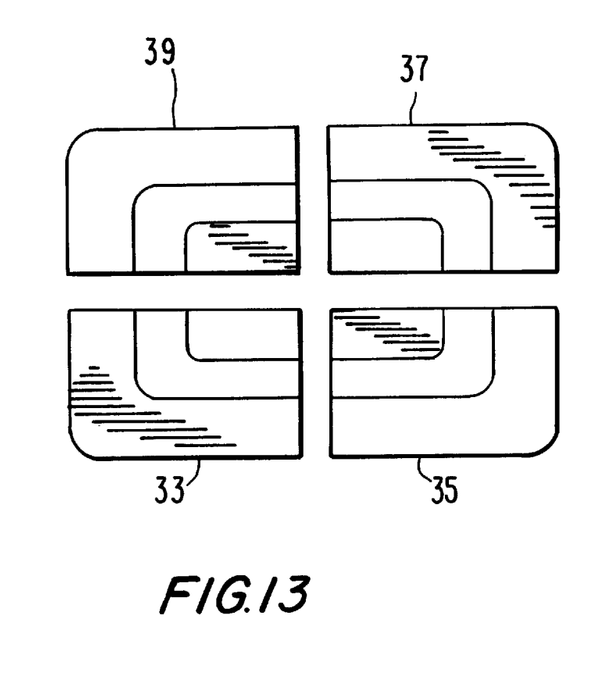
FIG. 13 is a plan view of an exemplary embodiment of a template with several sections upon which coils can be formed according to the invention.
Figure 14:
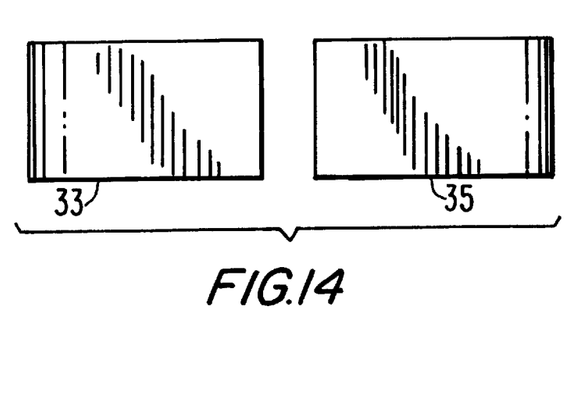
FIG. 14 is an elevation view of another embodiment of a template that may be used according to the invention.

While the invention could be practiced using a template 30 such as that illustrated in FIG. 3, it could also be practiced using other types of templates. For example, template 30 may have more than two sections as shown in FIG. 13, or it may be formed from two or more sections that do not have steps, but whose relative positioning may be altered as illustrated in FIG. 14.

Turning back to FIG. 3, as flyer 20 rotates, wire 22 may be delivered to any of template steps 32, 34, 36 or 38, but will preferably be delivered to bottom step 32 first. The sizes of template steps 32, 34, 36 and 38 will preferably correspond to sizes of coils 24 that will be placed inside the slots 12 and 14 of stator core 10. Coil size will typically be changed by delivering wire 22 to a smaller or larger step, while the size of the turns within a given coil will be varied by expanding the diameter of template 30 during winding. Steps are usually, but not necessarily, wound in succession to form the desired coils. In the illustration, a coil is being formed on the step indicated with reference numeral 34. Previously formed wire turns 28 fall from step 34 toward insertion tool 40 for placement between the designated rods 42.

Rods 42 may be located at various distances from each other. Rods 42 that will be selected to receive a given coil will preferably be a pair that has dimensions that correspond to those of the coil. In other words, rods 42 that are used to support a completed coil 24 will preferably be those that are spaced apart by an amount that corresponds to the diameter of the coil that they will support. It should be noted here while only one coil is shown being formed on step 34, multiple coils will typically be formed on each step and placed on insertion tool 40. The winder will then be aligned with another step, and several coils will be formed on it and placed on insertion tool 40. FIG. 3 shows one coil for clarity of the drawings only.

With continued reference to FIG. 3, wire turns 28 that are removed from template 30 ride down rods 42 of insertion tool 40 to coil support 16. While the use of rods is preferred, it should be noted that other types of guides may be used to transport wire turns 28 from template 30 to coil support 16. As wire turns 28 fall to coil support 16, they are held by constraints 44. These constraints 44 are shaped to cause individual wire turns 28 to stack on top of each other in the order they are delivered to insertion tool 40.

More specifically, constraints 44 collect wire turns 28 and maintain them in an order that will cause longer turns to be placed deeply into the slots, and shorter turns to be placed toward the center of the slot. In the preferred embodiment of the invention, the wire turns will be collected to place the longest turn in the deepest position in the slots, and consecutively shorter turns in positions inside the slots that are progressively closer to the central axis of the core. The invention is described here with a single wire turn 28 being placed at each depth within slots 12 and 14. However as a practical matter, several wire turns with substantially the same lengths will be collected at the same depth. Then a set of smaller wire turns with substantially the same lengths will be placed at an adjacent depth inside the slots that is slightly closer to the axis of the core. This pattern typically repeats itself, with consecutively smaller collections of wire turns 28 being placed at gradually decreasing depths inside slots 12 and 14.

Figure 6:
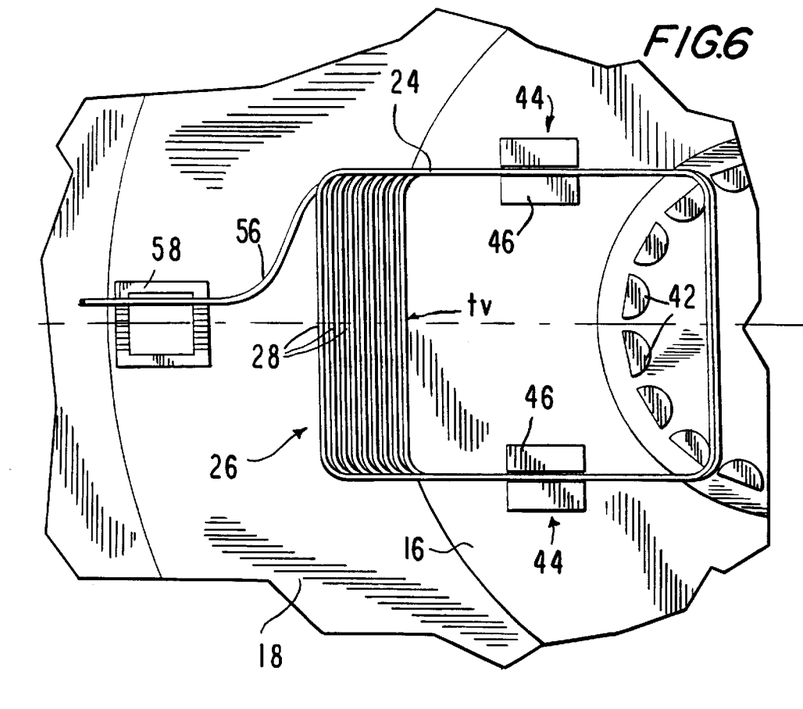
FIG. 6 is a plan view of a coil and insertion tool according to principles of the present invention.
Figure 7:
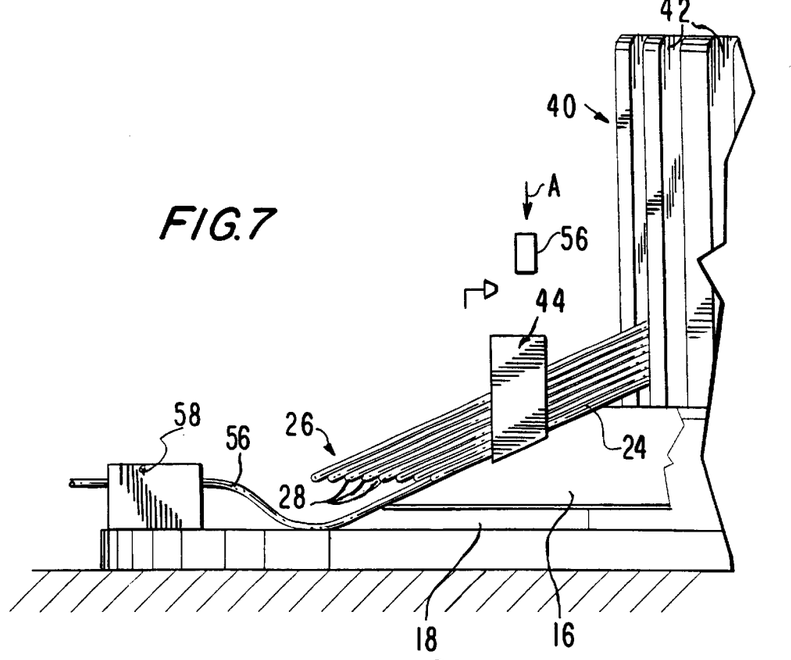
FIG. 7 is an elevation view of the coil and insertion tool illustrated in FIG. 6.

Collecting wire turns in the desired order preferably includes stacking subsequently placed wire turns 28 in individual layers on top of those turns that have been stacked before it. Each individual layer preferably includes only one turn, and the turns are preferably collected in sets that have different lengths. As best illustrated in FIGS. 6 and 7, this typically results in wire turns that are aligned on three sides of the coil and that extend freely on one side in the preferred embodiment of the invention. In this embodiment, wire turns 28 lay on top of each other with the shortest turns resting at the bottom of the stack.

More specifically, wire turns 28 preferably include distinguishable portions according to an aspect of the invention. As best illustrated in FIG. 6, in the preferred embodiment of the invention complete wire turns 28 have a substantially rectangular shape, with a distinguishable top, bottom and two sides. While wire turns 28 are shown having a rectangular shape, those skilled in the art will recognize that the invention could be adapted to form other shapes, depending upon the shape of template 30. As is also indicated in FIG. 6, at least one of the distinguishable portions of each wire turn 28 extends freely to accommodate their varied lengths. Other portions of wire turns 28, shown here as the top and bottom portions, are constrained. Constraining one or more of the distinguishable portions of wire turns 28 maintains them in the desired length dependent order.

According to the invention, wire turns 28 are delivered to insertion tool 40 without disturbing the length dependent order that has been achieved. Turning back to FIG. 3, in the illustrated embodiment of the invention, wire turns 28 are being delivered to insertion tool 40 in the order in which they are formed. The shortest turn is formed first and is delivered to the insertion tool first, and progressively longer turns are formed in succession and are delivered to the insertion tool in consecutive order. Template sections 33 and 35 are preferably moved apart gradually during winding to form successively longer wire turns 28. When the turns are inserted into the slots, the coil will have its longest turns at the outermost portion and its shortest turns near the central axis of the stator core.

Figure 4:
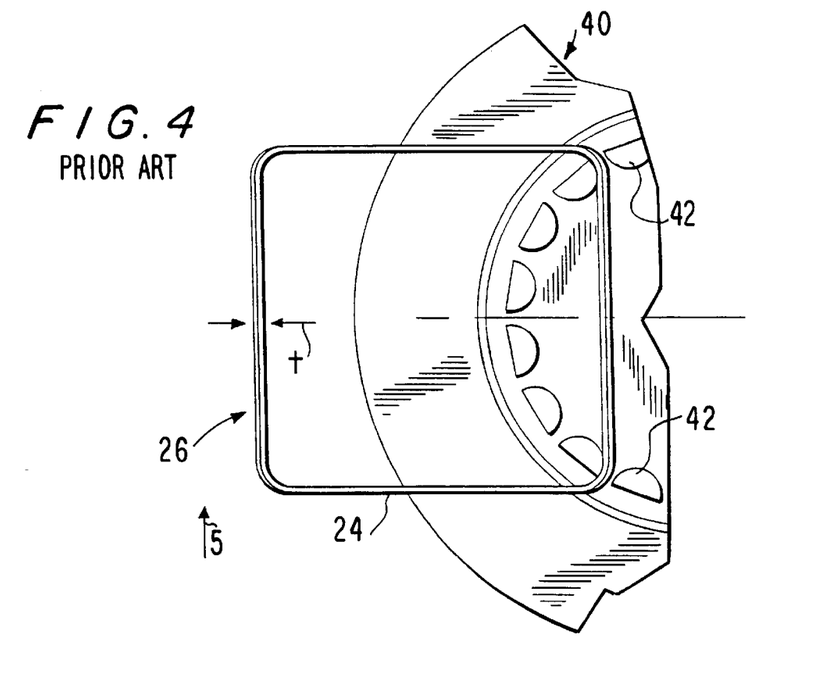
FIG. 4 is a plan view of a traditionally formed coil placed in a standard insertion tool.
Figure 5:
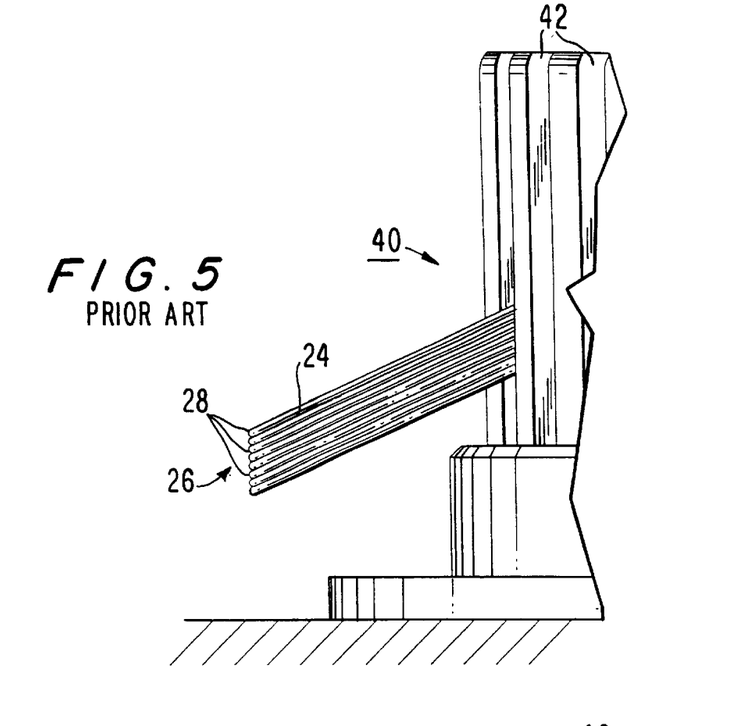
FIG. 5 is a elevation view of the coil and insertion tool illustrated in FIG. 4.

FIG. 4 contains a top view illustrating how a coil that has been formed with constant length wire turns 28 would appear placed between two rods 42 on an insertion tool. Because all wire turns 28 have the same length, the turns at the free end 26 of coil 24 would be bundled within a narrow thickness $t_c$. When viewed from the side, free end 26 would be substantially vertical, as illustrated in FIG. 5. Again, this is because all the turns have substantially the same length.

Referring again to FIG. 6, coil 24 that has been formed with wire turns 28 with varied lengths is shown placed between the same two rods 42 of insertion tool 40 that were shown in FIG. 4. However here, outcome of stacking the wire turns based upon their length is apparent. As shown, wire turns at free end 26 take up a much wider thickness $t_v$, because the wire turns have different lengths. Referring again to FIG. 7 a side view of coil 24 of FIG. 6 also illustrates that coil turns 28 are not vertically aligned at free end 26.

Figure 12:
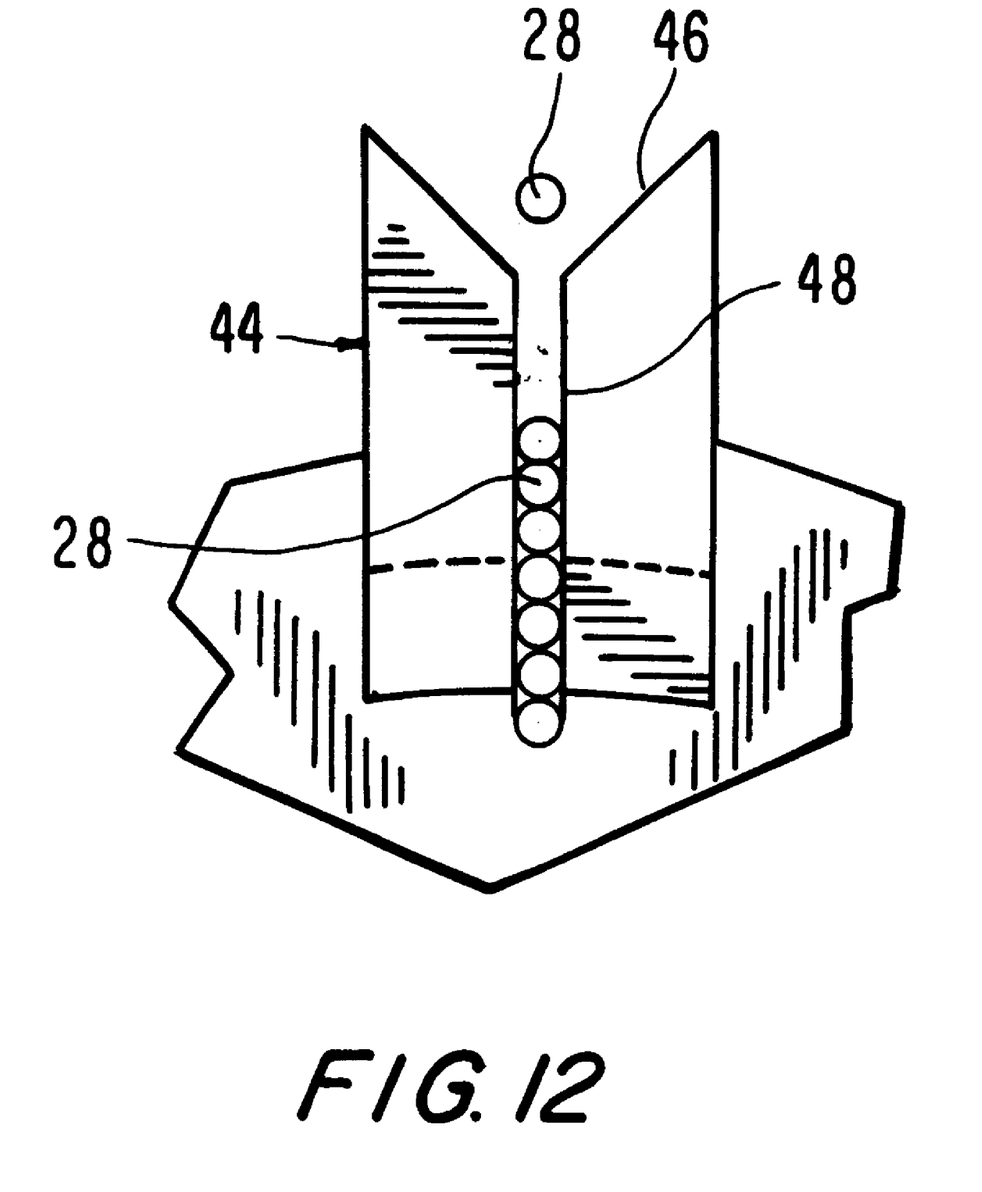
FIG. 12 is a detailed view of a coil constraint that may be used in accordance with the invention.

As already discussed, insertion tool 40 has rods 42 for receiving coils 24. Constraints 44 on coil support 16 collect wire turns 28 and maintain them in the order they are delivered to insertion tool 40. Turning for a moment to FIG. 12, in one embodiment of the invention, coil constraint 44 includes a channel 48 with a width that is dependent upon the gauge of the wire that will be inserted into the stator slots. An opening 46 is located at the end of the channel to guide the wire into the channel. Moveable pusher 56 may optionally be provided and moved in the downward direction A to assist further in packing the turns tightly inside channel 48. Wire turns 28 may be removed from template 30 and are transported down rods 42 toward coil support 16. As the wire turns approach constraint 44, they are drawn into channel 48 through opening 46. The narrow width of channel 48 prevents individual wire turns 28 from bundling, and instead forces them to stack on top of each other, and thereby maintain their proper order. While coil constraint 44 as illustrated here may successfully be used, numerous other coil constraints may also be used to practice the invention and the invention is not limited to this embodiment.

Under most circumstances, template sections 33 and 35 will be moved apart (i.e. distance d will be increased) as winding takes place to increase the size of later formed turns. Because turns that are formed later during the winding process typically fall to insertion tool 40 after the earlier formed shorter turns, finished coils most often appear as shown in FIGS. 6 and 7. However, for certain wire and coil sizes (i.e. relatively thin wire or wire turns that form coils with very small diameters), it can be difficult to avoid over tensioning the wire. For this reason, one embodiment of the invention includes winding the larger wire turns first and decreasing distance d as subsequent turns 28 are formed.

In such a case, if previously described embodiments of the invention are practiced, the longer wire turns 28 will descend from template 30 before the shorter wire turns. Wire turns delivered to an insertion tool such as that shown in FIGS. 6 and 7 would form coils in which the shorter turns are deposited on top of the longer turns. This is undesirable since the shorter turns are likely to fall inside of the longer turns and cause the wire coil to become tangled.

Figure 8:
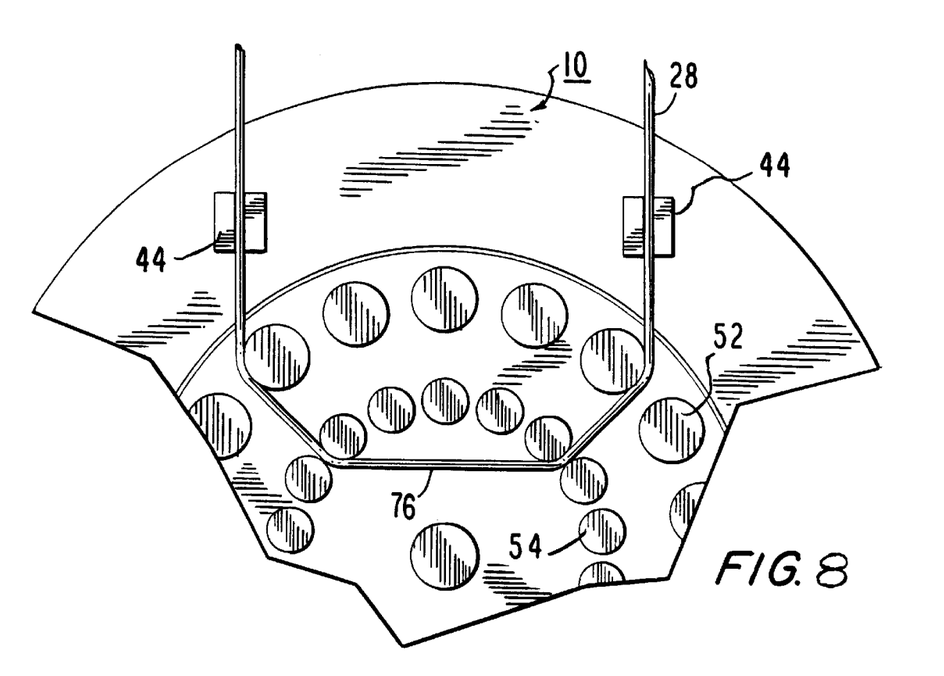
FIG. 8 is a plan view of a transfer tool of the present invention.

Thus, when over tensioning is a concern (or when there is any other reason to form larger turns before forming the smaller turns) it is preferable to use a transfer tool 50 such as that illustrated in FIG. 8 to allow the wire turns to be inverted before they reach insertion tool 40 to place the shortest turns at the bottom of the coil. Like insertion tool 40, transfer tool 50 stacks and maintains wire turns 28 in an order that is dependent upon their length, which is preferably the order in which they were received from template 30. Transfer tool 50 typically has multiple arrays of rods 52 and 54 to rotate coils 24 into their proper position. In the preferred embodiment of the invention, two concentrically arranged arrays of rods are provided as shown.

The rod arrays are configured such that wire turns 28 will be routed around the rods 52 and 54 that correspond to rods 42 on insertion tool 40 that will properly insert the completed coil 24 in slots 12 and 14. This routing of turns 28 around rods 52 and 54, and subsequent placement of coil 24 on insertion tool 40 should take place without disturbing the stacking order or shape of wire turns 28.

Figure 9:
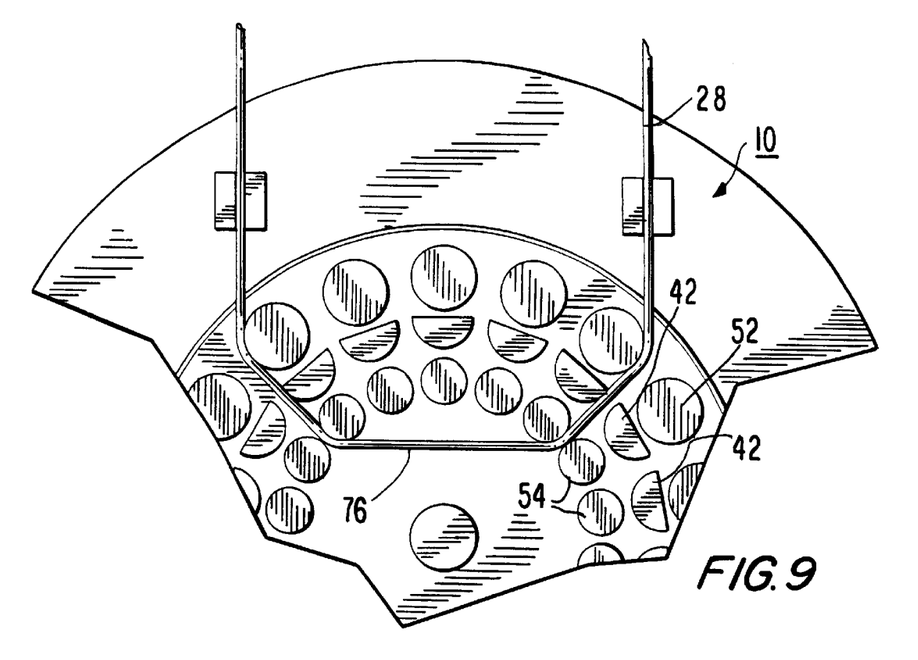
FIG. 9 is a plan view of a transfer tool joined to an insertion tool according to an aspect of the invention.

Once coil 24 (configured with its largest turns at the bottom) has been placed on transfer tool 50, an insertion tool 40 may be turned over and placed on top of it. One way to join insertion tool 40 and transfer tool 50 is to place an array of rods 42 between arrays of rods 52 and 54, as illustrated in FIG. 9. The base of transfer tool 50 will preferably face the base of insertion tool 40 when the two tools are joined.

In one embodiment of the invention, insertion tool 40 and transfer tool 50 are rotated while they are still joined in order to invert coil 24. A support plate 76 similar to coil support 16 will preferably be applied to coil 24 opposite coil support 16 while this inversion takes place. Once the joined insertion and transfer tools have been rotated, the shorter turns 28 rest on insertion tool 40 at the bottom of coil 24. The presence of support plate 76 during rotation of the tools and transfer of the coil to insertion tool 24 assists in maintaining the wire turns 28 in their length dependent order. Support plate 76 can then be removed and the two tools then be separated to leave the coil resting on insertion tool 40, configured with the larger turns 28 at the top as was the case in the embodiment of the invention illustrated in FIGS. 6 and 7.

Turning back to FIG. 3, various functions can be used to set the magnitude of the distance between template sections 33 and 35 and/or the rate at which that distance is varied during winding by flyer 20. In one embodiment of the invention, the distance between template sections 33 and 35 is varied based upon which turn 28 in coil 24 is being wound and of the position of flyer 20 as that turn 28 is being formed. For example, the system may be set up such that d will be varied by a designated amount when the flyer is at an angle θ with respect to some reference point during formation of turn number n in coil 24. In another embodiment, the distance is varied for a designated amount of time after turn x has been formed until turn y is formed.

The speed at which template sections 33 and 35 are moved apart will typically be dependent upon the characteristics of the wire being used to form coil 24. One of the most significant characteristics is the strength of the wire, and more specifically, the ability of the wire to resist weakening as tension is applied to it. Thus when a coil 24 is formed using a thick wire, d may usually be increased at a faster rate than when a coil 24 is formed using a thinner wire.

Still other parameters may be used to vary distance d. For example, template halves 33 and 35 may be moved apart when a designated length of wire has been delivered to the template. Devices that measure such parameters may be placed at numerous points along the path between the template and flyer or at some other location.

In one embodiment of the invention, template sections 33 and 35 are moved away from and toward each other using a controlled motor drive. In such an embodiment, wire tension readers and/or wire length consumption readers can be dispersed along the path between the wire source and flyer 20. A wire length consumption reader may be used to provide feedback, almost instantaneously, of the length of wire that is being used during winding. Readers such as these are described in U.S. Pat. Nos. 5,383,619, 5,628,472, and 5,664,735, the contents of which are hereby incorporated by reference in their entirety. Feedback about wire length consumption, tension or another relevant parameter can be used in a servo loop for the controlled motor drive, in order to more accurately control the separation distance between the template halves, and the rate at which it varies.

Referring for a moment to FIG. 2, while wire turns that are closest to the central axis of stator core 10 will usually be the shortest with successive turns 28 becoming progressively longer at further distances from the center of the core, other scenarios are possible. For example, if a slot 12 or 14 is wider at the depths that are furthest from and nearest to the central axis of the stator core, yet very narrow between these extremes, wire turns in the center of coil 24 may be the shortest. If the width of the slot varies in other ways, the lengths of wire turns 28 will be varied accordingly.

The description thus far has described the invention with reference to winding and inserting a single coil 24 into a pair of slots 12 and 14 of stator core 10. Those skilled in the art will recognize that actual winding of a stator core 10 will usually require sequential winding of coils 24 of different sizes, and placement of these different sized coils 24 on insertion tool 40 around rods 42 that are spaced by different amounts—distances that correspond to appropriate coil diameter sizes. Coils 24 will be inserted into stator core 10 as described. Those skilled in the art will also recognize that the principles of the invention that have been explained to form one coil can be applied to form each of the other coils. The same support plate 16 can be used for coils 24 that have different sizes, and constraints can be shifted closer to or away from rods 42 to suit the various coil sizes which descend from the template 30.

Leads of the coils can be formed in any of the many ways known in the art. One such way has been described in U.S. Provisional Application No. 60/124,226 filed Mar. 12, 1999, the contents of which are hereby incorporated by reference in its entirety, and in U.S. Ser. No. 09/522,228 filed Mar. 9, 2000 the contents of which are hereby incorporated by reference in its entirety.

While leads may be formed in many ways, it is important to note that the wire turn formation that has been developed using the present invention must not be disturbed while this takes place. Referring again to FIGS. 6 and 7, an initial lead 56 of coil 24 will preferably be anchored at two points, both of which lie outside coil 24. In the embodiment of the invention illustrated, lead 56 is anchored in connector block 58. However as those skilled in the art will recognize, lead 56 can be anchored at two points outside of the coil in other devices and in other ways, or it could be anchored at only one point or at more than two points. One way to anchor lead 56, for example, is to use a termination robot. Regardless of how the lead is anchored, slack should be present in the portion of the wire that lies between lead 56 and the size ordered turns 28 of coil 24 as shown in the illustration.

Figure 10:
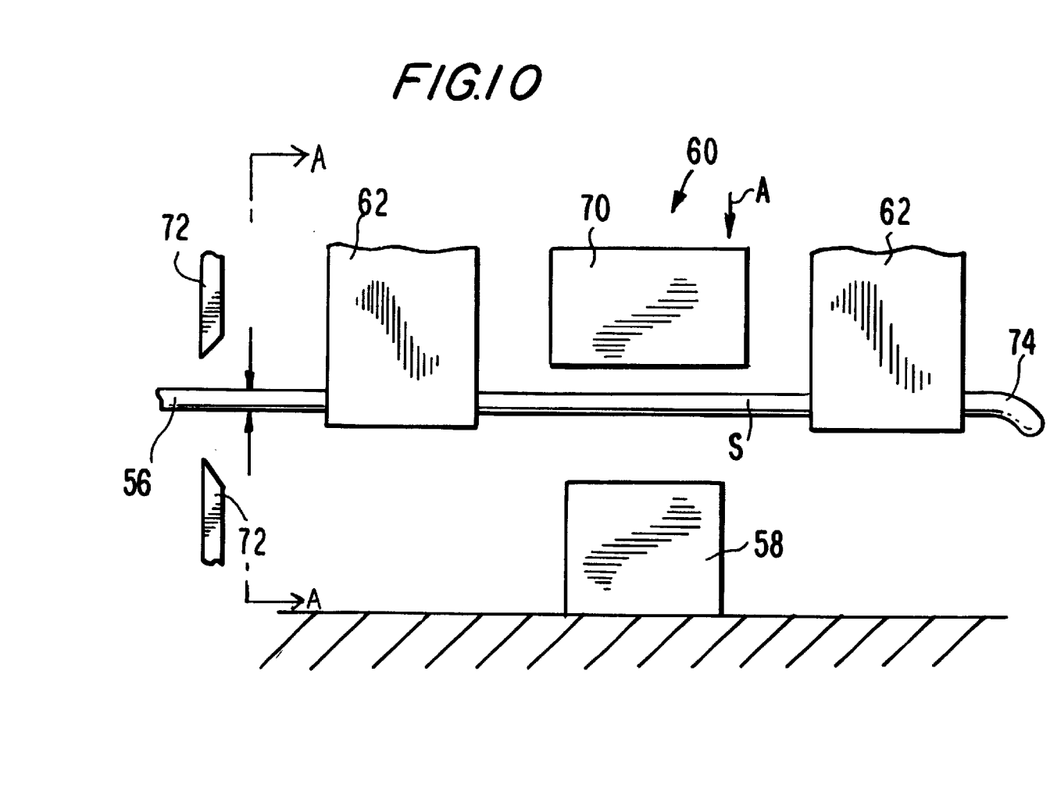
FIG. 10 is an elevation view of an end effector which can be used to form leads according to an aspect of the invention, shown from the same view as that of FIG. 7.
Figure 11:
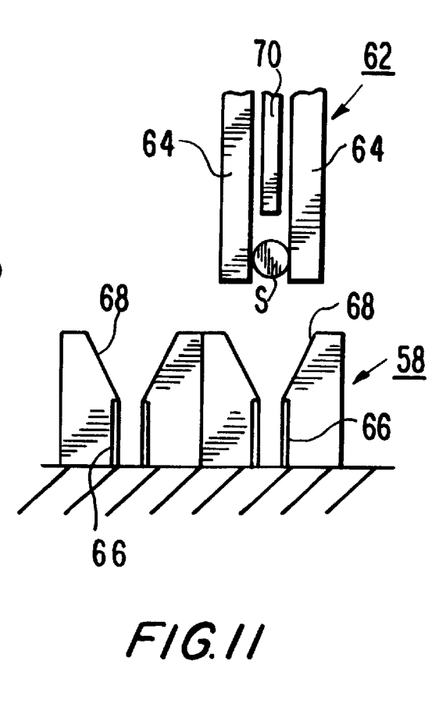
FIG. 11 is a view of the end effector of FIG. 10 shown from the direction indicated by arrows A.

FIGS. 10 and 11 provide one example of the manner in which leads 56 can be connected according to an aspect of the invention. In this illustrated example, an end effector 60 includes two wire grippers 62 for maintaining a segment S of lead 56 without leaving slack in the wire. Again, it should be noted here that the sized ordered formation of turns 28 in coil 24 should not be disturbed as segment S is tightened and maintained. Each wire gripper 62 preferably includes two opposite pliers 64 for gripping the lead. In one embodiment of the invention segment S is inserted within clamping portions 66 of connector block 58. Connector block 58 is also provided with V shaped entries 68 to align segment S with clamping portions 66. Insertion blade 70 (moveable in the direction of arrow B) is also provided for moving segment S deeply into clamping portions 66. Cutting blades 72 (moveable in the direction of arrow C) are provided on to cut the lead of the wire at the end that exits flyer 20. Loose end 74 of lead 56 is actually attached to coil 24 in insertion tool 40 as shown in FIG. 7.

Naturally, while the principles of the invention remain the same, the details of construction and the embodiments may widely vary with respect to what has been described and illustrated purely by way of example, without departing from the scope of the present invention.

What is claimed is:

1. An apparatus for forming wire coils from wire turns with varied lengths, comprising:
    a template positioned to receive wire from a winder, said template being configured to vary a length of at least two consecutive wire turns during receipt of said wire; and
    an insertion tool, which includes:
        i) a coil support that collects said wire turns in an order that is dependent upon their respective lengths; and
        ii) a coil constraint which maintains said wire turns in a coil in said collected order.

2. An apparatus as claimed in claim 1 wherein a wire turn length is dependent upon a location inside a slot where it is intended to place said wire turn.

3. An apparatus as claimed in claim 1 wherein sets of wire turns have lengths that exceed the lengths of an immediately previously maintained set of wire turns.

4. An apparatus as claimed in claim 1 wherein said insertion tool includes rods that are arranged to match slot positions.

5. An apparatus as claimed in claim 1 wherein said wire turn order enables a wire coil to be inserted into a pair of slots, with each turn resting at a depth inside said slot that corresponds to its length.

6. An apparatus as claimed in claim 5 wherein a length of at least one wire turn is substantially equal to the distance around said stator core slot pair into which it is inserted.

7. An apparatus as claimed in claim 1 wherein said coil constraint maintains said wire turns in an order in which they were formed on said template.

8. An apparatus as claimed in claim 1 wherein said coil constraint maintains said wire turns in an opposite order from that in which they were formed on said template.

9. An apparatus as claimed in claim 8 further comprising a transfer tool which collects said wire turns from said template in an order they were formed on said template and delivers said wire turns to said insertion tool in an order opposite to said collected order.

10. An apparatus as claimed in claim 9 wherein the configuration of said transfer tool is dependent upon the configuration of said insertion tool.

11. An apparatus as claimed in claim 10 further comprising a support plate which maintains said wire turns in an order in which they were collected on said transfer tool.

12. An apparatus as claimed in claim 1 wherein said coil constraint maintains said wire turns in layers, with a single wire turn in each layer.

13. An apparatus as claimed in claim 1 wherein at least two of said layers include wire turns that have different lengths.

14. An apparatus as claimed in claim 1 wherein said layers are arranged in a stack such that a shortest wire turn is in a first outer layer and the lengths of consecutively formed wire turns gradually increases such that a longest wire turn is in a second outer layer.

15. An apparatus as claimed in claim 1 wherein said wire turns include distinguishable portions.

16. An apparatus as claimed in claim 15 wherein one of said distinguishable portions includes freely extending portions of wire turns.

17. An apparatus as claimed in claim 16 wherein at least two of said freely extending wire turn portions extend to different lengths.

18. An apparatus as claimed in claim 15 wherein at least one of said distinguishable portions is constrained to cause said wire turns to be maintained in said length dependent order.

19. An apparatus as claimed in claim 1 wherein said template configuration includes at least two sections whose relative positioning may be varied.

20. An apparatus as claimed in claim 19 wherein feedback about wire received by said template is used to vary said template section relative positioning.

21. An apparatus as claimed in claim 20 wherein said feedback includes information about a length of a wire turn.

22. An apparatus as claimed in claim 20 wherein said feedback includes an amount of time that has elapsed since delivery of wire to said template began.

23. An apparatus as claimed in claim 20 wherein said feedback includes information about a position of said winder.

24. An apparatus as claimed in claim 20 wherein said feedback includes information about tension in said wire.

25. A method of forming wire coils that have varied lengths, comprising the steps of:

varying a length of at least two consecutive wire turns as said wire turns are formed on said template;

collecting said wire turns in an order that is dependent upon their respective lengths; and maintaining said wire turns in a coil in said collected order.

26. A method as claimed in claim 25 further comprising choosing a wire turn length based upon a location at which it will be placed.

27. A method as claimed in claim 25 further comprising increasing the length of each consecutively formed wire turn.

28. A method as claimed in claim 25 further comprising inserting the wire coil into a pair of slots.

29. A method as claimed in claim 28 further comprising placing each wire turn at a depth inside said slot that corresponds to the length of said wire turn.

30. A method as claimed in claim 25 further comprising maintaining said wire turns in layers, with a single wire turn in each layer.

31. A method as claimed in claim 30 wherein the wire coil includes at least two of layers with wire turns that have different lengths.

32. A method as claimed in claim 30 further comprising placing a shortest wire turn in a first outer layer and placing progressively longer wire turns in successive layers, thereby placing a longest wire turn in a second outer layer.

33. A method as claimed in claim 25 further comprising inverting said wire turns prior to said collecting step, and maintaining said wire turns in said length dependent order during said inverting step.

34. A method as claimed in claim 25 further comprising providing feedback about wire received by said template to vary said template section relative positioning.

* * * * *